United States Patent
Oosawa

(10) Patent No.: US 11,067,961 B2
(45) Date of Patent: Jul. 20, 2021

(54) CONTROLLER AND MACHINE LEARNING DEVICE

(71) Applicant: FANUC Corporation, Yamanashi (JP)

(72) Inventor: Tomohito Oosawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 16/192,803

(22) Filed: Nov. 16, 2018

(65) Prior Publication Data

US 2019/0155245 A1 May 23, 2019

(30) Foreign Application Priority Data

Nov. 17, 2017 (JP) .............................. JP2017-222156

(51) Int. Cl.
*G05B 19/25* (2006.01)
*B23H 7/20* (2006.01)
(Continued)

(52) U.S. Cl.
CPC .............. *G05B 19/25* (2013.01); *B23H 7/065* (2013.01); *B23H 7/20* (2013.01); *G06N 3/006* (2013.01);
(Continued)

(58) Field of Classification Search
CPC .......... G05B 19/25; G05B 2219/40499; G05B 2219/45221; G05B 2219/37506; B23H 7/08; B23H 7/02; B23H 7/065; B23H 7/20
See application file for complete search history.

(56) References Cited

U.S. PATENT DOCUMENTS 4,518,842 A   5/1985  Obara
5,473,532 A * 12/1995 Unno ............... G05B 19/40937
                                                    700/32
(Continued)

FOREIGN PATENT DOCUMENTS

CN    1413134 A     4/2003
CN    105682840 A   6/2016
(Continued)

OTHER PUBLICATIONS

Tzeng, C. J., et al. "Optimization of Wire Electrical Discharge Machining of Pure Tungsten Using Neural Network and Response Surface Methodology." Proceedings of the Institution of Mechanical Engineers, Part B: Journal of Engineering Manufacture, vol. 225, No. 6, Jun. 2011 (Year: 2011).*

(Continued)

*Primary Examiner* — Kakali Chaki
*Assistant Examiner* — Adam C Standke
(74) *Attorney, Agent, or Firm* — Hauptman Ham, LLP

(57) ABSTRACT

A machine learning device provided in a controller for controlling a wire electrical discharge machine uses state variables (including data relating to a correction amount, a machining path, machining conditions, and a machining environment) observed by a state observation unit and determination data acquired by a determination data acquisition unit to machine-learn a correction for a machining path. Using the learning result, the machining path can be corrected automatically and accurately on the basis of a partial machining path, the machining conditions and the machining environment of the machining performed by the wire electrical discharge machine.

5 Claims, 7 Drawing Sheets

(51) Int. Cl.
   *G06N 3/08*    (2006.01)
   *G06N 3/00*    (2006.01)
   *B23H 7/06*    (2006.01)
   *B23H 7/02*    (2006.01)

(52) U.S. Cl.
   CPC ............... *G06N 3/08* (2013.01); *B23H 7/02* (2013.01); *G05B 2219/37506* (2013.01); *G05B 2219/40499* (2013.01); *G05B 2219/45221* (2013.01)

(56) References Cited

U.S. PATENT DOCUMENTS

| | | | |
|---|---|---|---|
| 5,504,294 A * | 4/1996 | Izumiya | B23H 7/06 219/69.12 |
| 5,770,830 A * | 6/1998 | Chuang | B23H 7/065 219/69.12 |
| 6,774,334 B1 | 8/2004 | Kobayashi | |
| 2002/0082742 A1 | 6/2002 | Kadono | |
| 2014/0190940 A1 | 7/2014 | Hiraga | |
| 2015/0127149 A1 * | 5/2015 | Sinyavskiy | G06N 3/008 700/250 |
| 2016/0236292 A1 | 8/2016 | Onodera et al. | |
| 2016/0346853 A1 | 12/2016 | Tuboguchi | |
| 2017/0028553 A1 * | 2/2017 | Tsuda | B25J 9/0084 |
| 2017/0031328 A1 * | 2/2017 | Sawada | G05B 19/404 |
| 2017/0031343 A1 * | 2/2017 | Hatanaka | G05B 19/19 |
| 2017/0060105 A1 * | 3/2017 | Onodera | G05B 13/0265 |
| 2017/0087654 A1 | 3/2017 | Abe et al. | |
| 2019/0232488 A1 * | 8/2019 | Levine | G05B 19/042 |

FOREIGN PATENT DOCUMENTS

| | | |
|---|---|---|
| EP | 3135417 A1 | 3/2017 |
| JP | S58-120428 A | 7/1983 |
| JP | H4-348818 A | 12/1992 |
| JP | H5-228736 A | 9/1993 |
| JP | H6-170694 A | 6/1994 |
| JP | H7-285029 A | 10/1995 |
| JP | 2002-189510 A | 7/2002 |
| JP | 2014-148036 A | 8/2014 |
| JP | 2016-224642 A | 12/2016 |
| JP | 2017-42882 A | 3/2017 |
| JP | 2017-64830 A | 4/2017 |

OTHER PUBLICATIONS

Tadanobu, et al. "Deep reinforcement learning for high precision assembly tasks." 2017 IEEE/RSJ International Conference on Intelligent Robots and Systems (IROS). IEEE, Sep. 2017 (Year: 2017).*
Lin et al."Improvement of machining accuracy by fuzzy logic at corner parts for wire-EDM." Fuzzy sets and systems 122.3 (2001) (Year: 2011).*
Extended European Search Report in EP Application No. 18206123.4, dated Apr. 2, 2019, 9pp.

* cited by examiner

FIG. 6
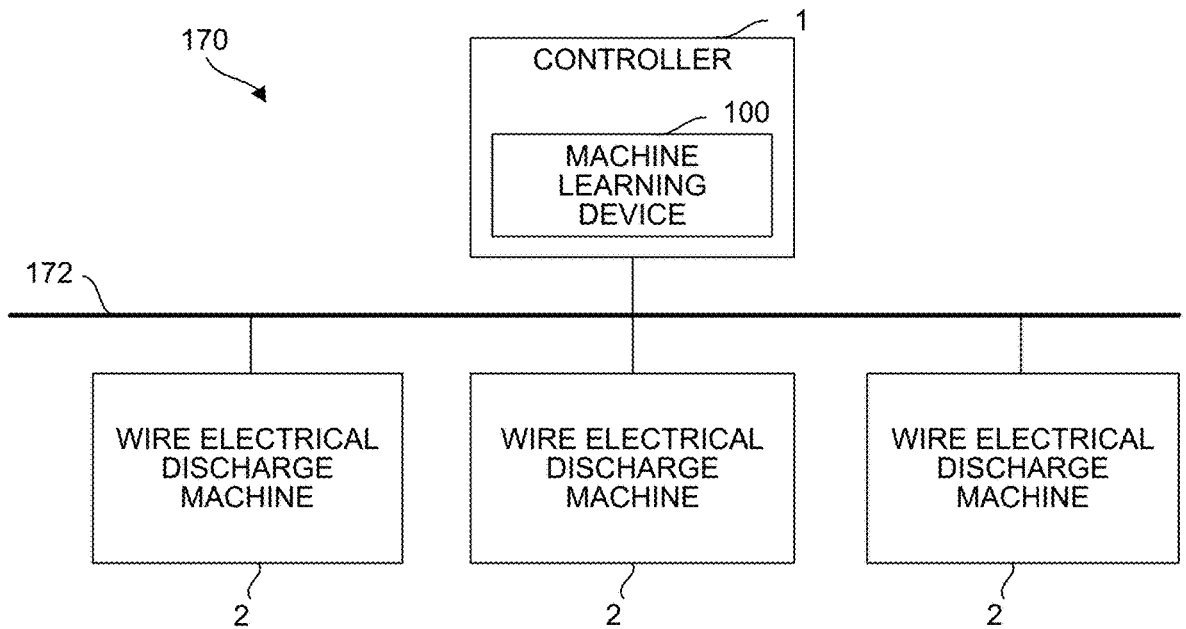
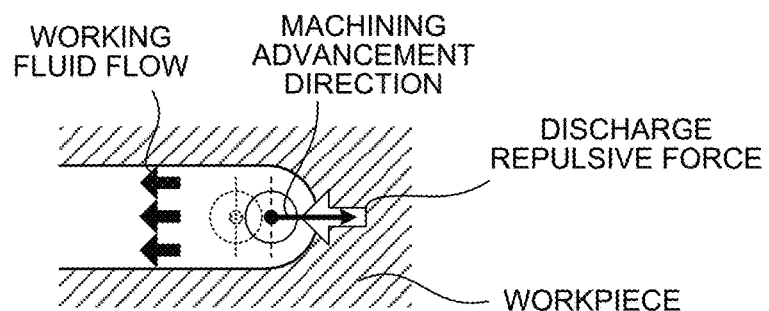
FIG. 7
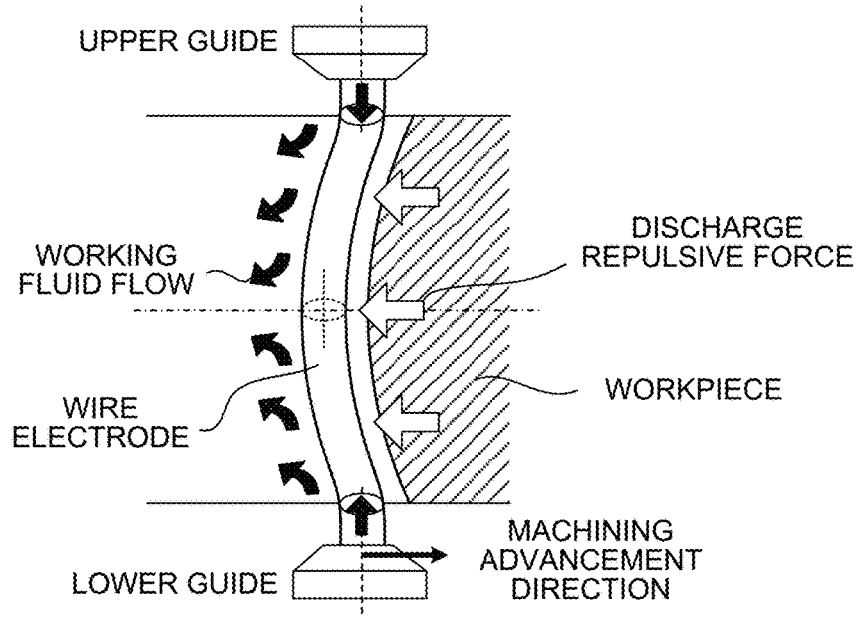

CONTROLLER AND MACHINE LEARNING DEVICE

RELATED APPLICATIONS

The present application claims priority of Japanese Application Number 2017-222156, filed on Nov. 17, 2017, the disclosure of which is hereby incorporated by reference herein in its entirety.

BACKGROUND OF THE INVENTION

1. Field of the Invention

The present invention relates to a controller and a machine learning device.

2. Description of the Related Art

As shown in FIG. 7, during machining by a wire cut electrical discharge machine, a wire electrode may be deflected by a flow of working fluid or a discharge repulsive force generated between the wire electrode and a workpiece. When machining is performed in corner portions and arc portions without taking the effects of this deflection into consideration, a discrepancy corresponding to the deflection amount of the wire electrode (the lag of the wire electrode) occurs in the corner portion between the machining path and the actual wire locus, resulting in the formation of a deficient convex portion and an unremoved concave portion on the machined article (FIG. 8). Hence, the deflection amount of the wire electrode has a large effect in the corner portions and arc portions, leading to a large reduction in the shape precision of the corner portions, and as a result, a so-called "shear drop at a corner portion" occurs such that an intended shape cannot be obtained by machining.

In conventional techniques for avoiding the "shear drop at a corner portion", machining conditions (discharge conditions) and the machining speed are automatically adjusted (machining condition control) and the machining path is automatically corrected (machining path correction), in the corner portions and arc portions (Japanese Patent Application Publication No. S58-120428, Japanese Patent Application Publication No. 05-228736, and Japanese Patent Application Publication No. 2014-148036). By employing a conventional technique of this type, the machining conditions are modified when the wire electrode approaches a corner portion or an arc portion of the machining path in order to control the discharge voltage and the pressure and flow rate of the working fluid so as to reduce the pressure exerted on the wire electrode, and as a result, the deflection amount thereof decreases. In so doing, reductions can be achieved in the amount by which the wire electrode cuts into the workpiece or leaves the workpiece unremoved in the corner portions and arc portions. Further, by correcting the commanded path of the wire electrode so that the deflected part of the wire electrode moves along the commanded path, the amounts by which the wire electrode cuts into the workpiece or leaves the workpiece unremoved in the corner portions and arc portions can be reduced. Control of the machining conditions and correction of the machining path are executed on the basis of data (block length, corner angle, arc radius, arc center angle, and so on) relating to the shape of the machining path, these data being calculated by a numerical value controller.

However, with the conventional technique of modifying the machining conditions when the wire electrode approaches a corner portion or an arc portion on the machining path, deflection of the wire is alleviated by intentionally modifying the machining speed, and therefore the machining speed decreases correspondingly, leading to an increase in the machining time.

Further, with the conventional technique of correcting the machining path in consideration of the deflection of the wire electrode, an experienced operator must correct the machining path on the basis of a rule of thumb, and therefore, although it may be possible to correct the machining path favorably in relation to a simple shape, it is not always possible to correct the machining path effectively on every type of corner.

SUMMARY OF THE INVENTION

Hence, an object of the present invention is to provide a controller and a machine learning device for use during wire electrical discharge machining, with which an optimal machining path on which a shear drop at a corner portion does not occur can be calculated without increasing the machining time more than necessary.

In the present invention, the problems described above are solved by introducing a machine learning device into a controller for controlling a wire electrical discharge machine, and using machine learning to learn an optimal machining path on which a shear drop at a corner portion can be prevented in corner portions and arc portions without increasing the machining time more than necessary.

A controller according to an aspect of the present invention machines a workpiece by controlling a wire electrical discharge machine on the basis of a machining program, and includes a machine learning device that learns a correction for a machining path of the machining with respect to a partial machining path, machining conditions and a machining environment of the machining. The machine learning device includes a state observation unit that observes, as state variables representing a current state of an environment, correction amount data indicating a correction amount for the machining path of the machining, machining path data indicating the partial machining path of the machining, machining condition data indicating the machining conditions of the machining, and machining environment data relating to the machining environment of the machining, a determination data acquisition unit that acquires, as determination data, machining accuracy determination data indicating an appropriateness determination result relating to a machining accuracy realized when machining is performed on the basis of the machining path corrected by the correction amount, and machining time determination data indicating an appropriateness determination result relating to a machining time required to perform machining on the basis of the machining path corrected by the correction amount, and a learning unit that uses the state variables and the determination data to learn the partial machining path, the machining conditions and the machining environment of the machining, and the correction for the machining path during the machining in association with each other.

The learning unit may include a reward calculation unit that determines a reward relating to the appropriateness determination result, and a value function updating unit that uses the reward to update a function representing a value of the correction for the machining path during the machining with respect to the partial machining path, the machining conditions and the machining environment of the machining. The reward calculation unit may issue a steadily higher award as the machining accuracy increases and an increase in the machining time decreases.

The learning unit may calculate the state variables and the determination data using a multilayer structure.

A controller according to another aspect of the present invention machines a workpiece by controlling a wire electrical discharge machine on the basis of a machining program, and includes a machine learning device that learns a correction for a machining path of the machining with respect to a partial machining path, machining conditions and a machining environment of the machining. The machine learning device includes a state observation unit that observes, as state variables representing a current state of an environment, correction amount data indicating a correction amount for the machining path of the machining, machining path data indicating the partial machining path of the machining, machining condition data indicating the machining conditions of the machining, and machining environment data relating to the machining environment of the machining, a learning unit that learns the partial machining path, the machining conditions and the machining environment of the machining, and the correction for the machining path during the machining in association with each other, and an estimation result output unit that outputs the correction amount for the machining path on the basis of the state variables observed by the state observation unit and a learning result generated by the learning unit.

The machine learning device may exist in a cloud server.

A machine learning device according to an aspect of the present invention learns, with respect to a partial machining path, machining conditions and a machining environment of machining performed by a wire electrical discharge machine that machines a workpiece on the basis of a machining program, a correction for a machining path of the machining. The machine learning device includes a state observation unit that observes, as state variables representing a current state of an environment, correction amount data indicating a correction amount for the machining path of the machining, machining path data indicating the partial machining path of the machining, machining condition data indicating the machining conditions of the machining, and machining environment data relating to the machining environment of the machining, a determination data acquisition unit that acquires, as determination data, machining accuracy determination data indicating an appropriateness determination result relating to a machining accuracy realized when machining is performed on the basis of the machining path corrected by the correction amount, and machining time determination data indicating an appropriateness determination result relating to a machining time required to perform machining on the basis of the machining path corrected by the correction amount, and a learning unit that uses the state variables and the determination data to learn the partial machining path, the machining conditions and the machining environment of the machining, and the correction for the machining path during the machining in association with each other.

A machine learning device according to another aspect of the present invention learns, with respect to a partial machining path, machining conditions and a machining environment of machining performed by a wire electrical discharge machine that machines a workpiece on the basis of a machining program, a correction for a machining path of the machining. The machine learning device includes a state observation unit that observes, as state variables representing a current state of an environment, correction amount data indicating a correction amount for the machining path of the machining, machining path data indicating the partial machining path of the machining, machining condition data indicating the machining conditions of the machining, and machining environment data relating to the machining environment of the machining, a learning unit that learns the partial machining path, the machining conditions and the machining environment of the machining, and the correction for the machining path during the machining in association with each other, and an estimation result output unit that outputs the correction amount for the machining path on the basis of the state variables observed by the state observation unit and a learning result generated by the learning unit.

According to the present invention, during wire electrical discharge machining, an optimal machining path on which a shear drop at a corner portion does not occur can be calculated without increasing the machining time more than necessary.

BRIEF DESCRIPTION OF THE DRAWINGS

FIG. 6 is a schematic function block diagram showing an embodiment of a system into which the controller is incorporated;

FIG. 7 is a view illustrating deflection of a wire electrode during wire cut electrical discharge machining.

DETAILED DESCRIPTION OF THE PREFERRED EMBODIMENTS

Figure 1:
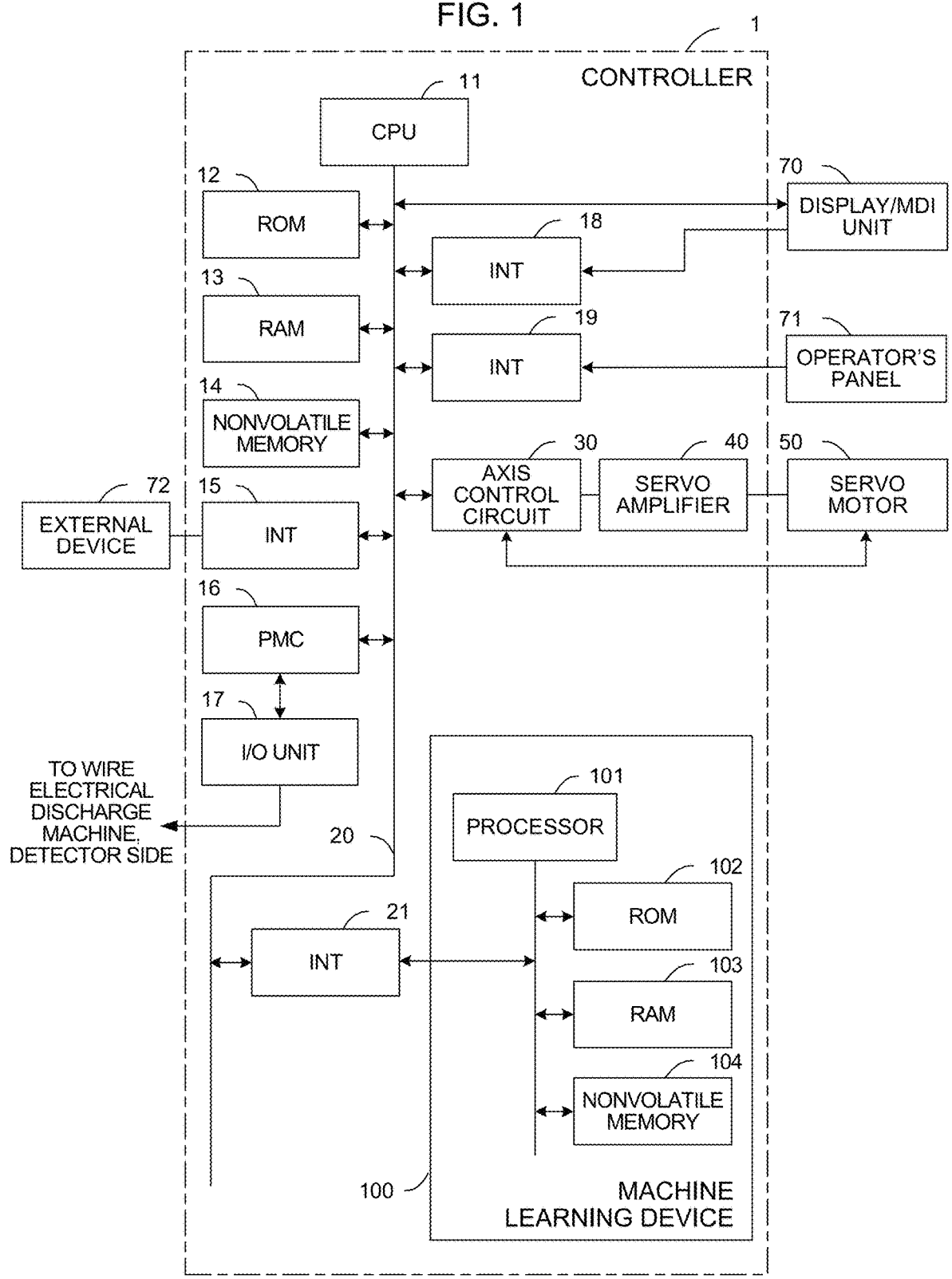
FIG. 1 is a schematic view showing a hardware configuration of a controller according to a first embodiment.

FIG. 1 is a schematic view showing a hardware configuration of main parts of a controller according to a first embodiment. A controller 1 can be implemented as a controller for controlling a wire electrical discharge machine, for example.

A CPU 11 provided in the controller 1 according to this embodiment serves as a processor for executing overall control of the controller 1. The CPU 11 reads a system program stored in a ROM 12 via a bus 20 and executes overall control of the controller 1 in accordance with the system program. A RAM 13 temporarily stores temporary calculation data and display data, various data input by an operator via an input unit, not shown in the figure, and so on.

A nonvolatile memory 14 is backed up by a battery, not shown in the figure, or the like, for example, so that a storage state thereof is maintained even after a power supply of the controller 1 is switched OFF. The nonvolatile memory 14 stores a machining program read from an external device 72 via an interface 15 or a machining program input via a display/MDI unit 70, and various data (for example, machining conditions for wire electrical discharge machining, information relating to a wire and a workpiece, positions of respective axes of the wire electrical discharge machine, the position of the wire, the outside air temperature, the temperature of a working fluid, the resistivity of the working fluid, a nozzle interval, and so on) acquired from respective parts of the controller 1 and the wire electrical discharge machine. The machining program and various data stored in the nonvolatile memory 14 may be expanded to the RAM 13 when executed/used. Further, various system programs (including a system program for controlling communication with a machine learning device 100, to be described below), such as a well-known analysis program, are written in advance to the ROM 12.

The interface 15 is used to connect the controller 1 to the external device 72, which is constituted by an adapter or the like. Programs, various parameters, and so on are read from the external device 72 side. Further, programs, various parameters, and so on edited in the controller 1 can be stored in external storage means via the external device 72. A programmable machine controller (PMC) 16 uses a sequence program built into the controller 1 to output signals to, and thereby control, the wire electrical discharge machine and a peripheral device (for example, an actuator such as a robot hand for exchanging tools) of the wire electrical discharge machine via an I/O unit 17. Furthermore, the PMC 16 receives signals from various switches and so on of an operator's panel disposed on a main body of the wire electrical discharge machine, executes required processing on the signals, and then transmits the signals to the CPU 11.

The display/MDI unit 70 is a manual data input device including a display, a keyboard, and so on. An interface 18 receives commands and data from the keyboard of the display/MDI unit 70 and transmits the received commands and data to the CPU 11. An interface 19 is connected to an operator's panel 71 that includes a manual pulse generator and so on used when respective axes are driven manually.

An axis control circuit 30 for controlling an axis of the wire electrical discharge machine receives an axis movement amount command from the CPU 11 and outputs an axis command to a servo amplifier 40. The servo amplifier 40 receives the command and drives a servo motor 50 for moving the axis of the wire electrical discharge machine. The servo motor 50 of the axis has an inbuilt position/speed detector, and executes position/speed feedback control by feeding back position/speed feedback signals from the position/speed detector to the axis control circuit 30. Note that on the hardware configuration diagram in FIG. 1, the axis control circuit 30, the servo amplifier 40, and the servo motor 50 are each shown singly, but in actuality are provided in a number corresponding to the number of axes provided in the wire electrical discharge machine serving as the control subject.

An interface 21 is used to connect the controller 1 to the machine learning device 100. The machine learning device 100 includes a processor 101 for executing overall control of the machine learning device 100, a ROM 102 storing a system program and so on, a RAM 103 for performing temporary storage during various processing relating to machine learning, and a nonvolatile memory 104 used to store a learning model and so on. The machine learning device 100 is capable of observing information (for example, the machining program, the machining conditions for wire electrical discharge machining, information relating to the wire and the workpiece, the positions of the respective axes of the wire electrical discharge machine, the position of the wire, the outside air temperature, the temperature of the working fluid, the resistivity of the working fluid, the nozzle interval, and so on) that can be obtained by the controller 1 via the interface 21. Further, the controller 1 controls the wire electrical discharge machine by receiving adjustment commands of a machining path of the wire electrical discharge machine which are output from the machine learning device 100.

Figure 2:
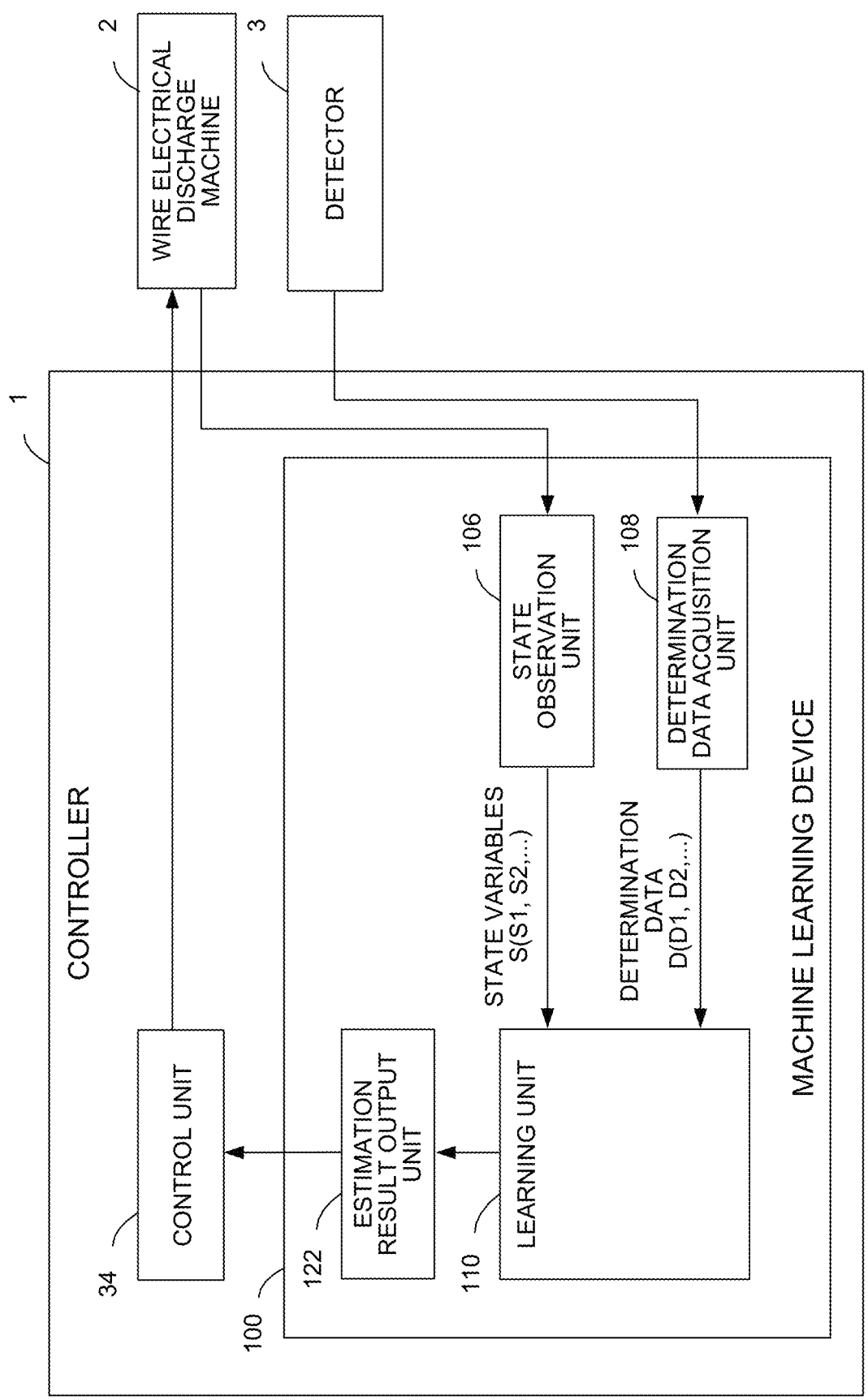
FIG. 2 is a schematic function block diagram of the controller according to the first embodiment.

FIG. 2 is a schematic function block diagram of the controller 1 and the machine learning device 100 according to the first embodiment. Respective function blocks shown in FIG. 2 are realized by having the CPU 11 of the controller 1 and the processor 101 of the machine learning device 100, as shown in FIG. 1, respectively execute system programs in order to control operations of the respective parts of the controller 1 and the machine learning device 100.

The controller 1 according to this embodiment includes a control unit 34 for controlling a wire electrical discharge machine 2 on the basis of the machining program stored in the nonvolatile memory 14 and an estimation result of an amount of correction for the machining path, output from the machine learning device 100.

Meanwhile, the machine learning device 100 provided in the controller 1 includes software (a learning algorithm and so on) and hardware (the processor 101 and so on) for self-learning, through so-called machine learning, an estimate of the amount of correction for the machining path in relation to a portion of the machining path before and after the position of the wire (referred to hereafter as a partial machining path), the machining conditions, and the machining environment of the machining performed by the wire electrical discharge machine 2. The items learned by the machine learning device 100 of the controller 1 correspond to a model structure expressing a correlation between the partial machining path, machining conditions, and machining environment of the machining performed by the wire electrical discharge machine, and the correction amount for the machining path.

As illustrated by the function blocks shown in FIG. 2, the machine learning device 100 of the controller 1 includes a state observation unit 106, a determination data acquisition unit 108 and a learning unit 110. The determination data acquisition unit 108 observes state variables S representing the current state of the environment, including correction amount data S1 indicating the correction amount for the machining path of the wire electrical discharge machine 2, machining path data S2 indicating the partial machining path corresponding to the current position of the wire of the wire electrical discharge machine, machining condition data S3 indicating the machining conditions, and machining environment data S4 relating to the machining environment. The determination data acquisition unit 108 acquires determination data D including machining accuracy determination data D1 indicating a machining accuracy realized when the machining path is corrected during machining by the wire electrical discharge machine 2 and machining time determination data D2 indicating a machining time of a machining operation by the wire electrical discharge machine. And the learning unit 110 uses the state variables S and the determination data D to learn the correction amount for the machining path in association with the partial machining path, machining conditions, and machining environment of the machining performed by the wire electrical discharge machine.

The correction amount data S1, among the state variables S observed by the state observation unit 106, can be acquired as the correction amount for the machining path of the machining performed by the wire electrical discharge machine 2. The correction amount for the machining path of the machining performed by the wire electrical discharge machine 2 is defined as an offset value in a left-right direction (an offset amount having a positive sign in either a leftward or a rightward direction) relative to an advancement direction of the machining path, for example.

The machining path data S2, among the state variables S observed by the state observation unit 106, can be acquired as a series of vector data extending from the current position of the wire to points obtained by dividing a portion of the machining path before and after the current position of the wire by a predetermined sampling distance. The vector data extending to the sampling points representing the portion of the machining path before and after the current position of the wire may be vector data that are normalized by converting coordinate values so that the current position of the wire serves as the origin and the advancement direction of the wire serves as a predetermined axis.

The machining condition data S3, among the state variables S observed by the state observation unit 106, can be acquired as a set of machining conditions of the wire electrical discharge machining performed by the wire electrical discharge machine 2. Examples of the machining conditions of the wire electrical discharge machining include a voltage value, a current value, a wire movement speed, a number of discharges per unit time, a working fluid pressure, and so on.

The machining environment data S4, among the state variables S observed by the state observation unit 106, can be acquired as a set of environmental conditions of the wire electrical discharge machining performed by the wire electrical discharge machine 2. Examples of the environmental conditions of the wire electrical discharge machine 2 include the workpiece material, the workpiece plate thickness, the wire diameter, the nozzle interval, and so on.

A machining path correction amount determined by the machine learning device 100 on the basis of the learning result of the learning unit 110 during a current learning period with respect to the partial machining path, machining conditions, and machining environment of the machining performed by the wire electrical discharge machine 2 during the learning period immediately preceding the current period may be directly used as the correction amount data S1. When this method is employed, the machine learning device 100 may store the machining path correction amount temporarily in the RAM 103 during each learning period, and the state observation unit 106 may acquire the machining path correction amount of the immediately preceding learning period from the RAM 103 as the correction amount data S1 of the current learning period.

The determination data acquisition unit 108 can use a machining accuracy realized when the machining path is corrected during machining by the wire electrical discharge machine 2 as the machining accuracy determination data D1. Alternatively, the path on which machining is actually performed after correcting the machining path may be measured by a measuring device 3 such as a laser measuring device or a camera, and a value indicating the degree to which the actual path matches the machining path commanded by the machining program (i.e. the smallness of an error) may be used by the determination data acquisition unit 108 as the machining accuracy determination data D1.

Further, as the machining time determination data D2, the determination data acquisition unit 108 can use the time required to machine the machining path when the machining path is corrected during machining by the wire electrical discharge machine 2. For example, a value indicating how small the difference is between an estimated machining time to be taken when the machining is performed with the machining path not corrected and an actual machining time to be taken when the machining is performed with the machining path corrected (in short, a value indicating how quickly the machining can be performed following the correction) may be used by the determination data acquisition unit 108 as the machining time determination data D2.

The state variables S input simultaneously into the learning unit 110, when considered in terms of the learning period of the learning unit 110, are based on data of the immediately preceding learning period in which the determination data D were obtained. Hence, as the machine learning device 100 of the controller 1 advances the learning process, acquisition of the machining path data S2, machining condition data S3, and machining environment data S4, correction of the machining path of the wire electrical discharge machine based on the correction amount data S1 estimated on the basis of the acquired data, and acquisition of the determination data D are implemented repeatedly in the environment.

The learning unit 110 learns the correction for the machining path with respect to the partial machining path, machining conditions, and machining environment of the machining performed by the wire electrical discharge machine 2 in accordance with a learning algorithm known generically as machine learning. The learning unit 110 can execute learning iteratively on the basis of a data set including the state variables S and the determination data D. As described above, during an iteration of a learning cycle for correcting the machining path with respect to the partial machining path, machining conditions, and machining environment of the machining performed by the wire electrical discharge machine, the state variables S are acquired from the partial machining path, machining conditions, and environmental conditions of the immediately preceding learning period and the machining path correction determined during the immediately preceding learning period, while the determination data D serve as appropriateness determination results indicating the appropriateness of machining based on the corrected machining path.

By implementing this learning cycle repeatedly, the learning unit 110 can automatically recognize characteristics implying the correlation between the machining path correction and the partial machining path, machining conditions, and machining environment of the machining performed by the wire electrical discharge machine 2. At the start of the learning algorithm, the correlation between the machining path correction and the partial machining path, machining conditions, and machining environment of the machining performed by the wire electrical discharge machine 2 is substantially unknown, but the learning unit 110 gradually recognizes the characteristics and interprets the correlation while advancing the learning process. Once the correlation between the machining path correction and the partial machining path, machining conditions, and machining environment of the machining performed by the wire electrical discharge machine 2 has been interpreted to a standard having a certain degree of reliability, the learning result output iteratively by the learning unit 110 can be used to select (or in other words, decide) an action for correcting the machining path with respect to the current state (i.e. the partial machining path, machining conditions, and machining environment of the machining performed by the wire electrical discharge machine). In other words, while advancing the learning algorithm, the learning unit 110 can gradually bring the correlation between the partial machining path, machining conditions, and machining environment of the machining performed by the wire electrical discharge machine 2 and the action for determining the value of the machining path correction with respect to the current state closer to an optimal solution.

An estimation result output unit 122 determines the correction amount for the machining path on the basis of the result learned by the learning unit 110, and outputs the determined correction amount to the control unit 34. The estimation result output unit 122 outputs the machining path correction amount when the partial machining path, machining conditions, and machining environment of the machining performed by the wire electrical discharge machine 2 are input into the machine learning device 100 in a state where learning by the learning unit 110 is complete.

As described above, in the machine learning device 100 of the controller 1, the learning unit 110 learns the correction for the machining path in accordance with a machine learning algorithm using the state variables S observed by the state observation unit 106 and the determination data D acquired by the determination data acquisition unit 108. The state variables S are constituted by data including the correction amount data S1, the machining path data S2, the machining condition data S3, and the machining environment data S4, while the determination data D are determined univocally by analyzing information acquired by the controller 1 from the wire electrical discharge machine 2 and the measuring device 3. According to the machine learning device 100 provided in the controller 1, therefore, the machining path can be corrected automatically and accurately in accordance with the partial machining path, machining conditions, and machining environment of the machining performed by the wire electrical discharge machine 2 using the learning result acquired by the learning unit 110.

Since the machining path can be corrected automatically, an appropriate value by which to correct the machining path can be determined quickly simply by ascertaining the partial machining path (the machining path data S2), the machining conditions (the machining condition data S3), and the machining environment (the machining environment data S4) of the machining performed by the wire electrical discharge machine 2. As a result, the correction for the machining path can be determined efficiently.

Figure 3:
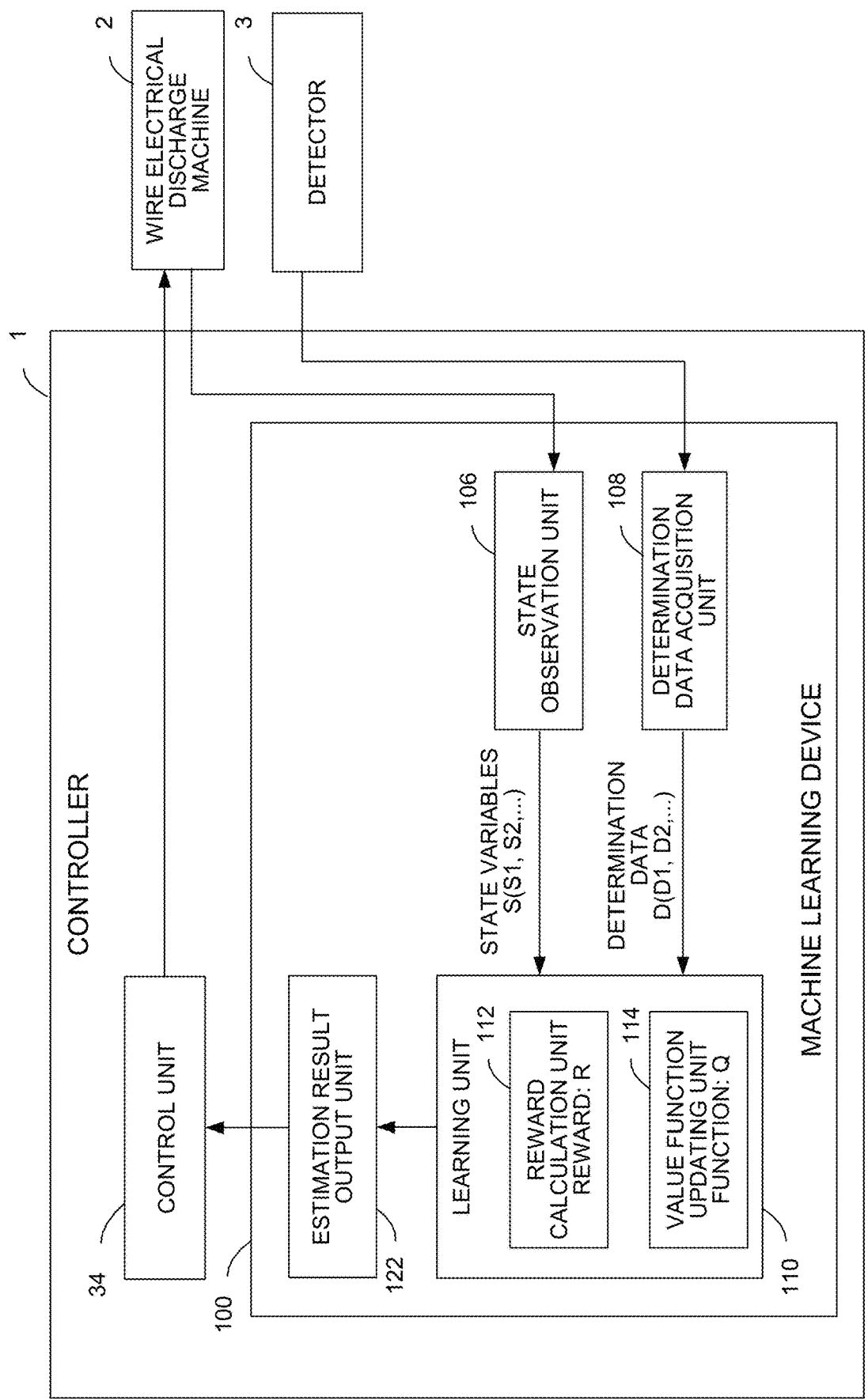
FIG. 3 is a schematic function block diagram showing an embodiment of the controller.

In the machine learning device 100 configured as described above, there are no particular limitations on the learning algorithm executed by the learning unit 110, and a learning algorithm that is well-known in the field of machine learning may be employed. FIG. 3 shows an embodiment of the controller 1 of FIG. 2, in which the learning unit 110 executes reinforcement learning as an example of the learning algorithm. Reinforcement learning is a method for iteratively performing, by trial and error, a cycle of observing the current state of the environment in which a learning subject exists (i.e. input), executing a predetermined action in the current state (i.e. output), and attaching a reward of some type to the action. A policy (in the machine learning device of the present application, the correction for the machining path) for maximizing the sum of the reward is then learned as the optimal solution.

In the machine learning device 100 of the controller 1 shown in FIG. 3, the learning unit 110 includes a reward calculation unit 112 for determining a reward R relating to the appropriateness determination result (corresponding to the determination data D used during the next learning period in which the state variables S are acquired) of the machining performed by the wire electrical discharge machine when the machining path is corrected on the basis of the state variables S, and a value function updating unit 114 that updates a function Q expressing a value of the correction applied to the machining path using the reward R. The learning unit 110 learns the correction for the machining path in relation to the machining path, machining conditions, and machining environment of the machining performed by the wire electrical discharge machine by having the value function updating unit 114 update the function Q repeatedly.

An example of a reinforcement learning algorithm executed by the learning unit 110 will now be described. The algorithm according to this example is known as Q-learning. In Q-learning, a state s of an agent and actions a that can be selected by the agent in the state s are used as independent variables in order to learn a function Q (s, a) representing the value of an action when the action a is selected in the state s. The optimal solution is acquired by selecting the action a at which the value function Q is maximized in the state s. Q-learning is started in a state where the correlation between the state s and the action a is unknown, and by a repeated process of trial and error in which various actions a are selected in an arbitrary state s, the value function Q is updated iteratively so as to approach the optimal solution. In this case, when the environment (in other words, the state s) varies as a result of selecting the action a in the state s, a reward (in other words, a weight applied to the action a) r corresponding to the variation is acquired, and by guiding the learning process so that an action a with which a higher reward r is acquired is selected, the value function Q can be brought close to the optimal solution comparatively quickly.

A typical formula for updating the value function Q can be expressed as shown below in formula (1). In formula (1), $s_t$ and $a_t$ respectively denote a state and an action at a time t. As a result of the action $a_t$, the state varies to $s_{t+1}$. $r_{t+1}$ denotes the reward acquired when the state varies from $s_t$ to $s_{t+1}$. The term max Q denotes Q when the action a that results in the maximum value Q (as assumed at the time t) is taken at a time t+1. α and γ respectively denote a learning coefficient and a discount factor, these values being set as desired within 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

When the learning unit 110 executes Q-learning, the state variables S observed by the state observation unit 106 and the determination data D acquired by the determination data acquisition unit 108 correspond to the state s of the update formula, the action for determining how to correct the machining path in relation to the current state (i.e. the partial machining path, machining conditions, and machining environment of the machining performed by the wire electrical discharge machine) corresponds to the action a of the update formula, and the reward R determined by the reward calculation unit 112 corresponds to the reward r of the update formula. Hence, the value function updating unit 114 repeatedly updates the function Q expressing the value of the machining path correction with respect to the current state by means of Q-learning using the reward R.

For example, the reward R determined by the reward calculation unit 112 can be set at a positive (plus) reward R when machining is performed by the wire electrical discharge machine on the basis of the determined machining path correction following determination of the machining path correction and the appropriateness determination result acquired in relation to the machining performed by the wire electrical discharge machine is "appropriate" (for example, when the machining accuracy of the part machined on the basis of the corrected machining path is high, an increase in the machining time required to perform machining on the basis of the corrected machining path is small, or the like), and can be set at a negative (minus) reward R when machining is performed by the wire electrical discharge machine on the basis of the determined machining path correction following determination of the machining path correction and the appropriateness determination result acquired in relation to the machining performed by the wire electrical discharge machine is "inappropriate" (for example, when the machining accuracy of the part machined on the basis of the corrected machining path is lower than a predetermined threshold, the increase in the machining time required to perform machining on the basis of the corrected machining path equals or exceeds a predetermined threshold, or the like). Absolute values of the positive and negative rewards R may be identical or different. Further, the plurality of values included in the determination data D may be combined and used as a determination condition.

Furthermore, the appropriateness determination result acquired in relation to the machining performed by the wire electrical discharge machine does not have to be limited to the two results "appropriate" and "inappropriate", and may be set in a plurality of stages. For example, in a case where an allowable error $E_{max}$ is used as an index of the machining accuracy of the machining performed by the wire electrical discharge machine, a reward of R=5 can be issued when the error E generated during the machining performed by the wire electrical discharge machine is $0 \leq E < E_{max}/5$, a reward of R=3 can be issued when $E_{max}/5 \leq E < E_{max}/2$, a reward of R=2 can be issued when $E_{max}/2 \leq E < E_{max}$, and a reward of R=1 can be issued when $E_{max} \leq E$. The manner in which the reward is issued may also be adjusted as appropriate in accordance with the aim of the learning, for example by issuing a large negative reward when the machining time required by the wire electrical discharge machine to perform the machining exceeds a predetermined threshold or the like. Moreover, $E_{max}$ may be set to be comparatively large at the initial stage of learning and then reduced as learning advances.

The value function updating unit 114 is capable of holding an action value table on which the state variables S, the determination data D, and the rewards R are arranged in association with the action value (a numerical value, for example) expressed by the function Q. A behavior of the value function updating unit 114 for updating the function Q is synonymous with a behavior of the value function updating unit 114 for updating the action value table. At the start of Q-learning, the correlation between the current state of the environment and the correction applied to the machining path is unknown, and therefore, on the action value table, the various state variables S, determination data D, and rewards R are prepared in association with a value of a randomly determined action value (function Q). Note that when the reward calculation unit 112 knows the determination data D, the reward calculation unit 112 can calculate the reward R corresponding thereto immediately and write the calculated reward R to the action value table.

As Q-learning advances using the reward R corresponding to the appropriateness determination result of the operating state of the wire electrical discharge machine, the learning is guided in a direction for selecting actions with which higher rewards R are acquired, and in accordance with the state of the environment (in other words, the state variables S and the determination data D), which varies as a result of executing the selected action in the current state, the action value table is updated by writing the value of the action value (the function Q) relating to the action performed in the current state thereto. By updating the action value table repeatedly, the value of the action value (the function Q) displayed on the action value table is rewritten to a steadily higher value as the action becomes more appropriate (in the case of the present invention, an action for improving the machining accuracy within a range where the cycle time of the machining performed by the wire electrical discharge machine does not greatly increase). Thus, the previously unknown correlation between the current state of the environment (the partial machining path, machining conditions, and machining environment of the machining performed by the wire electrical discharge machine) and the action (correction of the machining path) taken in response thereto gradually becomes clearer. In other words, by updating the action value table, the relationship between the correction applied to the machining path and the partial machining path, machining conditions, and machining environment of the machining performed by the wire electrical discharge machine gradually approaches the optimal solution.

Figure 4:
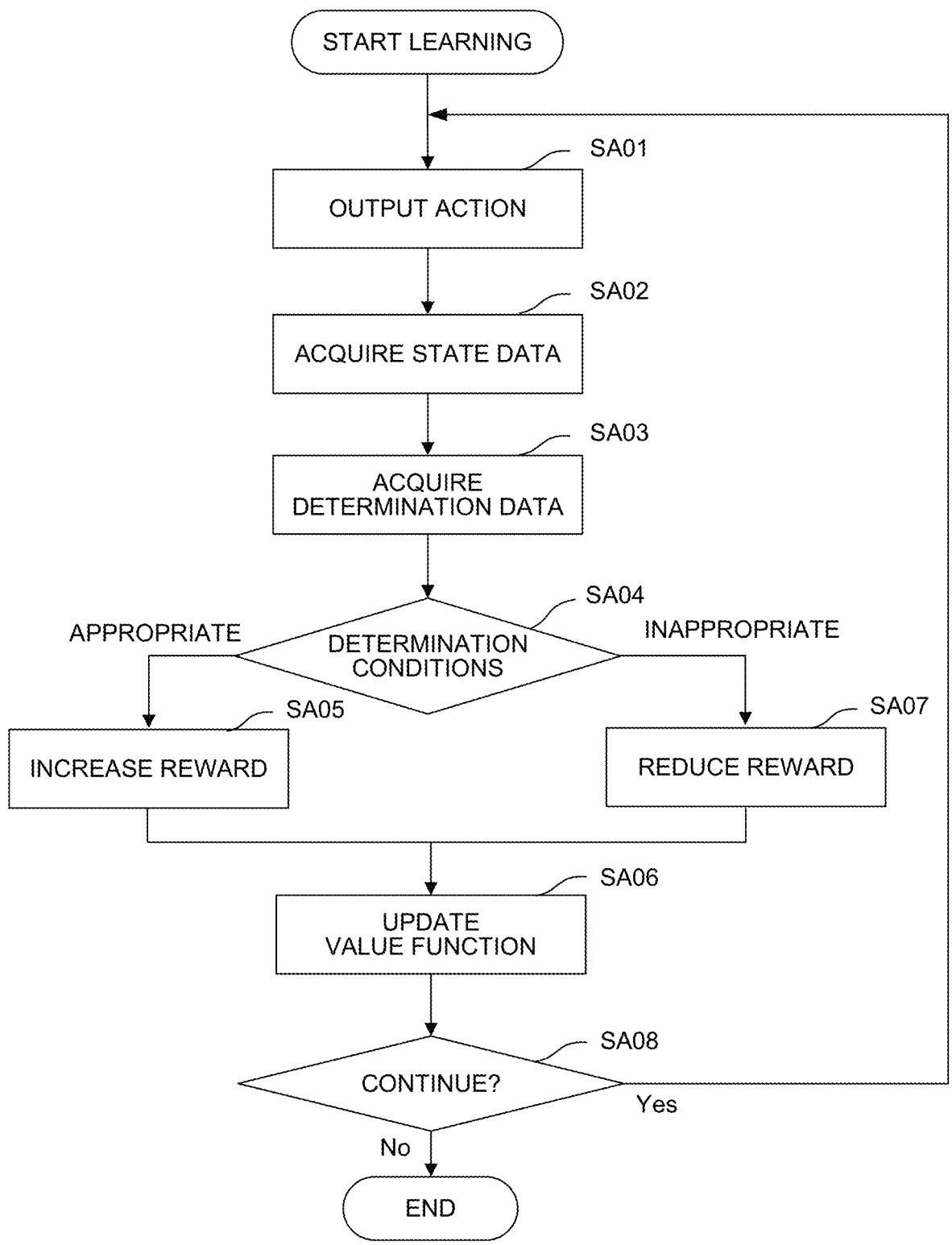
FIG. 4 is a schematic flowchart showing an embodiment of a machine learning method.

Referring to FIG. 4, the flow of the Q-learning executed by the learning unit 110 (in other words, an embodiment of a machine learning method) will be further described.

First, in step SA01, the value function updating unit 114 selects a correction amount for the machining path at random as the action to be taken in the current state, the current state being indicated by the state variables S observed by the state observation unit 106, while referring to the action value table at the current point in time. Next, the value function updating unit 114 takes in the state variables S of the current state, as observed by the state observation unit 106, in step SA02 and takes in the determination data D of the current state, as acquired by the determination data acquisition unit 108, in step SA03. Next, in step SA04, the value function updating unit 114 determines whether or not the correction amount applied to the machining path is appropriate on the basis of the determination data D, and when the correction amount is appropriate, applies the positive reward R determined by the reward calculation unit 112 to the update formula of the function Q in step SA05. Next, in step SA06, the value function updating unit 114 updates the action value table using the state variables S and determination data D of the current state, the reward R, and the value of the action value (the updated function Q). When the correction applied to the machining path is determined to be inappropriate in step SA04, the value function updating unit 114 applies the negative reward R determined by the reward calculation unit 112 to the update formula of the function Q in step SA07, whereupon the value function updating unit 114 updates the action value table using the state variables S and determination data D of the current state, the reward R, and the value of the action value (the updated function Q) in step SA06. The learning unit 110 updates the action value table iteratively by repeating steps SA01 to SA07, and in so doing advances the process of learning the correction for the machining path. Note that the processing for determining the reward R and the processing for updating the value function in steps SA04 to SA07 are executed on the respective data included in the determination data D.

Figure 5A:
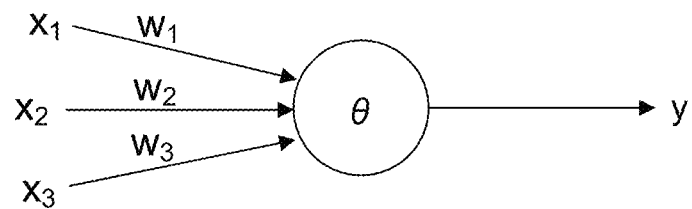
FIG. 5A is a view illustrating a neuron.
Figure 5B:
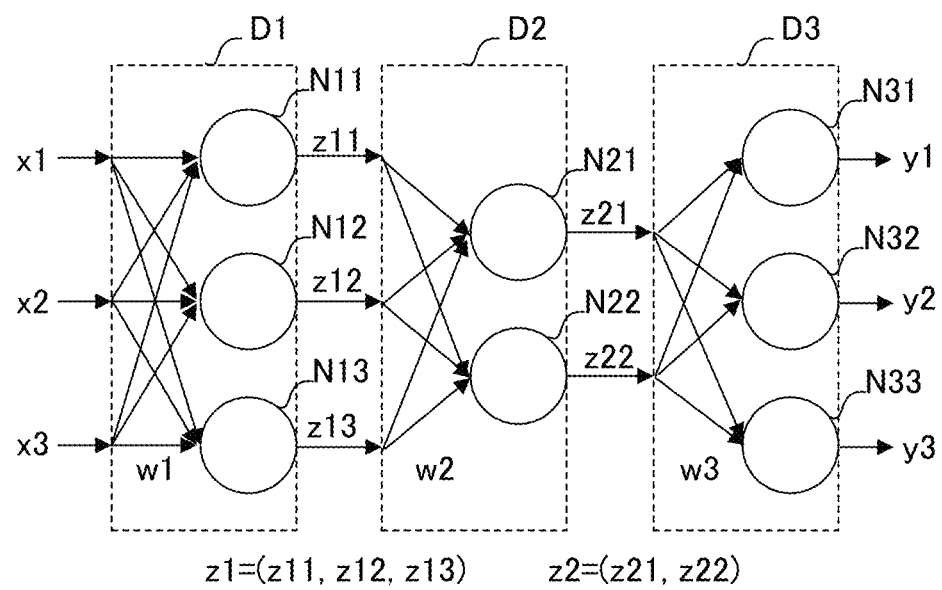
FIG. 5B is a view illustrating a neural network.
Figure 8:
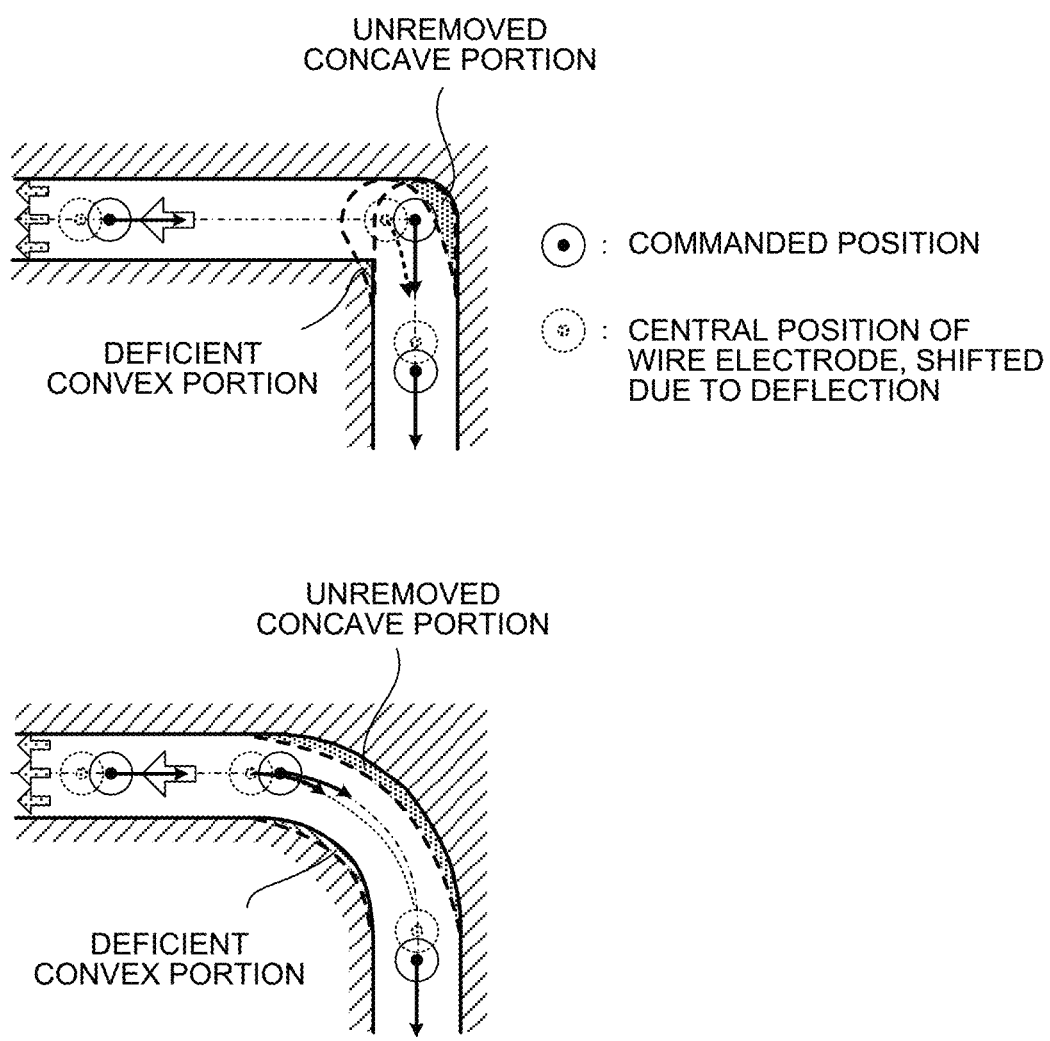
FIG. 8 is a view illustrating a shear drop at a corner portion in a corner portion and an arc portion of a machining path according to the prior art.

To advance the reinforcement learning process described above, a neural network, for example, can be applied. FIG. 5A is a pattern diagram showing a model of a neuron, and FIG. 5B is a pattern diagram showing a model of a three-layer neural network formed by combining the neuron shown in FIG. 5A. A neural network can be constructed using calculation devices, storage devices, or the like imitating a model of a neuron, for example.

The neuron shown in FIG. 5A outputs a result y in response to a plurality of inputs x (here, for example, an input $x_1$ to an input $x_3$). A corresponding weight w ($w_1$ to $w_3$) is applied to the input x. As a result, the neuron outputs the result y in the form shown below in formula (2). Note that in formula (2), the input x, the result y, and the weight w are all vectors. Further, θ denotes a bias and $f_k$ denotes an activation function.

$$y = f_k(\Sigma_{i=1}^{n} x_i w_i - \theta) \tag{2}$$

In the three-layer neural network shown in FIG. 5B, a plurality of inputs x (here, for example, inputs x1, x2, x3) are input from the left side and results y (here, for example, results y1, y2, y3) are output from the right side. In the example in the figure, corresponding weights (expressed collectively as w1) are multiplied respectively by the inputs x1, x2, x3 so that the individual inputs x1, x2, x3 are all input into three neurons N11, N12, N13.

The respective outputs of the neurons N11 to N13 are expressed collectively as z1. The outputs z1 can each be seen as a feature vector acquired by extracting a feature amount of the relevant input vector. In the example in FIG. 5B, corresponding weights (expressed collectively as w2) are multiplied respectively by the feature vectors z1 so that the individual vectors z1 are all input into two neurons N21, N22. The feature vectors z1 express features between the weight w1 and the weight w2.

The respective outputs of the neurons N21 and N22 are expressed collectively as z2. The outputs z2 can each be seen as a feature vector acquired by extracting a feature amount of the relevant feature vector z1. In the example in FIG. 5B, corresponding weights (expressed collectively as w3) are multiplied respectively by the feature vectors z2 so that the individual feature vectors z2 are all input into three neurons N31, N32, N33. The feature vectors z2 express features between the weight w2 and the weight w3. Finally, the neurons N31 to N33 respectively output the results y1 to y3.

Note that a so-called deep learning method employing a neural network formed from more than three layers may also be used.

In the machine learning device 100 of the controller 1, the correction for the machining path (the result y) can be output by having the learning unit 110 calculate a multilayer structure corresponding to the neural network described above using the state variables S and the determination data D as the input x. Further, in the machine learning device 100 of the controller 1, by using a neural network as the value function of Q-learning and having the learning unit 110 calculate a multilayer structure corresponding to the neural network described above using the state variables S and the action a as the input x, the value of the action in the relevant state (i.e. the result y) can be output. Note that the neural network includes a learning mode and a value prediction mode as operating modes. For example, in the learning mode, the weight w is learned using a learning data set, and in the value prediction mode, the value of an action can be determined using the learned weight w. Further, in the value prediction mode, detection, classification, reasoning, and so on are also performed.

The configuration of the controller 1 described above may also be described as a machine learning method (or software) executed by the processor 101 of the machine learning device 100. This machine learning method is a method for learning the correction for the machining path, in which a CPU of a computer performs a step for observing the correction amount data S1, the machining path data S2, the machining condition data S3, and the machining environment data S4 as the state variables S representing the current state of the environment in which the wire electrical discharge machine performs machining, a step for acquiring the determination data D indicating the appropriateness determination result of the machining performed by the wire electrical discharge machine on the basis of the determined machining path correction, and a step for using the state variables S and the determination data D to learn the machining path data S2, machining condition data S3, and machining environment data S4 and the correction for the machining path correction in association with each other.

FIG. 6 shows a system 170 according to a second embodiment, including the controller 1. The system 170 includes at least one controller 1 packaged as a part of a computer such as a cell computer, a host computer, or a cloud browser, a plurality of wire electrical discharge machines 2 serving as test subjects, and a wired or wireless network 172 connecting the controller 1 and the wire electrical discharge machines 2 to each other.

In the system 170 configured as described above, the controller 1 having the machine learning device 100 can use the learning result acquired by the learning unit 110 to determine, automatically and accurately, a correction for the machining path with respect to the partial machining path, machining conditions, and machining environment of the machining performed by the wire electrical discharge machine 2, for each wire electrical discharge machine 2. The machine learning device 100 of the controller 1 can also be configured to learn a common machining path correction to be applied to all of the wire electrical discharge machines 2 on the basis of the state variables S and the determination data D acquired for each of the plurality of wire electrical discharge machines 2, and apply the learning result to machining by all of the wire electrical discharge machines in common. Hence, according to the system 170, the speed and reliability with which the machining path correction is learned can be improved by employing more varied data (including the state variables S and the determination data D) as input.

Embodiments of the present invention were described above, but the present invention is not limited only to the exemplary embodiments described above and may be implemented in various other embodiments by applying appropriate modifications thereto.

For example, the learning algorithm and calculation algorithm executed by the machine learning device 100 and the control algorithm and so on executed by the controller 1 are not limited to the above examples, and various other algorithms may be employed.

Further, in the above embodiments, the controller 1 and the machine learning device 100 are described as devices having different CPUs, but the machine learning device 100 may be realized by the CPU 11 of the controller 1 and the system program stored in the ROM 12.

In the above embodiments, an example in which the controller 1 corrects the machining path during machining on the basis of the estimation result of the correction amount for the machining path, output by the machine learning device 100, but instead, a new machining program taking into account the machining path correction may be created on the basis of the machining path commanded by the machining program and a series of estimation results of the correction amount for the machining path, output by the machine learning device 100, and the created machining program may be output. By providing the wire electrical discharge machine 2 not including the machine learning device 100 with a machining program which the machining path correction is taken into consideration, the wire electrical discharge machine 2 can perform machining along an appropriate machining path offline, i.e. when not connected to the machine learning device 100.

The invention claimed is:

1. A controller for machining a workpiece by controlling a wire electrical discharge machine on a basis of a machining program, the controller comprising:
a machine learning device configured to learn a correction for a machining path of the machining with respect to a partial machining path, machining conditions, and a machining environment of the machining, the machine learning device comprising a processor configured to
observe, as state variables representing a current state of an environment,
correction amount data indicating a correction amount for the machining path of the machining,
machining path data indicating the partial machining path of the machining,
machining condition data indicating the machining conditions of the machining, and
machining environment data relating to the machining environment of the machining,
acquire, as determination data,
machining accuracy determination data indicating an appropriateness determination result relating to a machining accuracy realized when machining is performed on a basis of the machining path corrected by the correction amount, and
machining time determination data indicating an appropriateness determination result relating to a machining time required to perform machining on the basis of the machining path corrected by the correction amount,
learn the partial machining path, the machining conditions, and the machining environment of the machining, and the correction for the machining path during the machining in association with each other, applying the state variables and the determination data, and
correct the machining path in accordance with the partial machining path, the machining conditions, and the machining environment of the machining performed by the wire electrical discharge machine based on a learned result, wherein
the processor is configured to,
determine a reward relating to the appropriateness determination result,
apply the reward to update a function representing a value of the correction for the machining path during the machining with respect to the partial machining path, the machining conditions, and the machining environment of the machining,
in response to the machining accuracy being higher than a first predetermined threshold and an increase in the machining time being smaller than a second predetermined threshold, provide a positive reward to update the function, and
in response to the machining accuracy being equal to or lower than the first predetermined threshold and the increase in the machining time being equal to or greater than the second predetermined threshold, provide a negative reward to update the function.

2. The controller according to claim 1, wherein
the processor is configured to
issue a steadily higher award as the machining accuracy increases and the increase in the machining time decreases.

3. The controller according to claim 1, wherein the processor is configured to calculate the state variables and the determination data applying a multilayer structure.

4. The controller according to claim 1, wherein the machine learning device exists in a cloud server.

5. A machine learning device for learning a correction for a machining path of a machining, with respect to a partial machining path, machining conditions, and a machining environment of the machining performed by a wire electrical discharge machine to machine a workpiece on a basis of a machining program, the machine learning device comprising:
a processor configured to
observe, as state variables representing a current state of an environment,
correction amount data indicating a correction amount for the machining path of the machining,
machining path data indicating the partial machining path of the machining,
machining condition data indicating the machining conditions of the machining, and
machining environment data relating to the machining environment of the machining,
acquire, as determination data,
machining accuracy determination data indicating an appropriateness determination result relating to a machining accuracy realized when machining is performed on a basis of the machining path corrected by the correction amount, and
machining time determination data indicating an appropriateness determination result relating to a machining time required to perform machining on the basis of the machining path corrected by the correction amount,
learn the partial machining path, the machining conditions and the machining environment of the machining, and the correction for the machining path during the machining in association with each other, applying the state variables and the determination data, and
correct the machining path in accordance with the partial machining path, the machining conditions, and the machining environment of the machining performed by the wire electrical discharge machine based on a learned result, wherein
the processor is configured to,
determine a reward relating to the appropriateness determination result,
apply the reward to update a function representing a value of the correction for the machining path during the machining with respect to the partial machining path, the machining conditions and the machining environment of the machining,
in response to the machining accuracy being higher than a first predetermined threshold and an increase in the machining time being smaller than a second predetermined threshold, provide a positive reward to update the function, and
in response to the machining accuracy being equal to or lower than the first predetermined threshold and the increase in the machining time being equal to or greater than the second predetermined threshold, provide a negative reward to update the function.

* * * * *